United States Patent
Ito et al.

(10) Patent No.: US 10,853,205 B2
(45) Date of Patent: Dec. 1, 2020

(54) INFORMATION PROCESSING APPARATUS, METHOD OF CONTROLLING THE SAME AND STORAGE MEDIUM

(71) Applicant: CANON KABUSHIKI KAISHA, Tokyo (JP)

(72) Inventors: Takehiro Ito, Tokyo (JP); Takeru Imamura, Nagareyama (JP); Kohei Asano, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 183 days.

(21) Appl. No.: 16/030,133

(22) Filed: Jul. 9, 2018

(65) Prior Publication Data

US 2019/0018745 A1     Jan. 17, 2019

(30) Foreign Application Priority Data

Jul. 12, 2017    (JP) .................................. 2017-136439

(51) Int. Cl.
| | |
|---|---|
| *G06F 11/00* | (2006.01) |
| *G06F 11/20* | (2006.01) |
| *G06F 3/06* | (2006.01) |
| *G06F 11/10* | (2006.01) |

(52) U.S. Cl.
CPC .......... *G06F 11/2069* (2013.01); *G06F 3/065* (2013.01); *G06F 3/0619* (2013.01); *G06F 3/0658* (2013.01); *G06F 3/0689* (2013.01); *G06F 11/1076* (2013.01); *G06F 11/2082* (2013.01); *G06F 11/2087* (2013.01); *G06F 2201/82* (2013.01)

(58) Field of Classification Search
CPC .......................... G06F 11/1088; G06F 11/1092
See application file for complete search history.

(56) References Cited

U.S. PATENT DOCUMENTS

| | | | |
|---|---|---|---|
| 6,845,379 B2 | 1/2005 | Ito et al. | |
| 7,000,145 B2* | 2/2006 | Werner | ............... G06F 11/2082 707/999.202 |
| 9,131,090 B2 | 9/2015 | Shimizu et al. | |
| 2012/0084503 A1 | 4/2012 | Hagiwara | |
| 2014/0365819 A1* | 12/2014 | Cooper | ............... G06F 11/1092 714/6.22 |
| 2015/0331926 A1 | 11/2015 | Shimizu et al. | |
| 2018/0260124 A1* | 9/2018 | Schucker | ............ G06F 11/1469 |

FOREIGN PATENT DOCUMENTS

| | | |
|---|---|---|
| JP | 2006252451 A | 9/2006 |
| JP | 2012079100 A | 4/2012 |

OTHER PUBLICATIONS

"https://www.anandtech.com/print/9248/the-truth-about-ssd-data-retention" retrieved Aug. 6, 2018.

* cited by examiner

*Primary Examiner* — Christopher S McCarthy
(74) *Attorney, Agent, or Firm* — Venable LLP

(57) ABSTRACT

If a storage device B that is a target of rebuild processing is an SSD, in the rebuild processing, a RAID controller copies system data of the image forming apparatus to the storage device B after copying to the storage device B data other than the system data out of data stored in a storage device A. Accordingly, it is possible to copy the system data from the storage device A to the storage device B after the temperature of the flash memory in the storage device B (SSD) has increased.

11 Claims, 8 Drawing Sheets

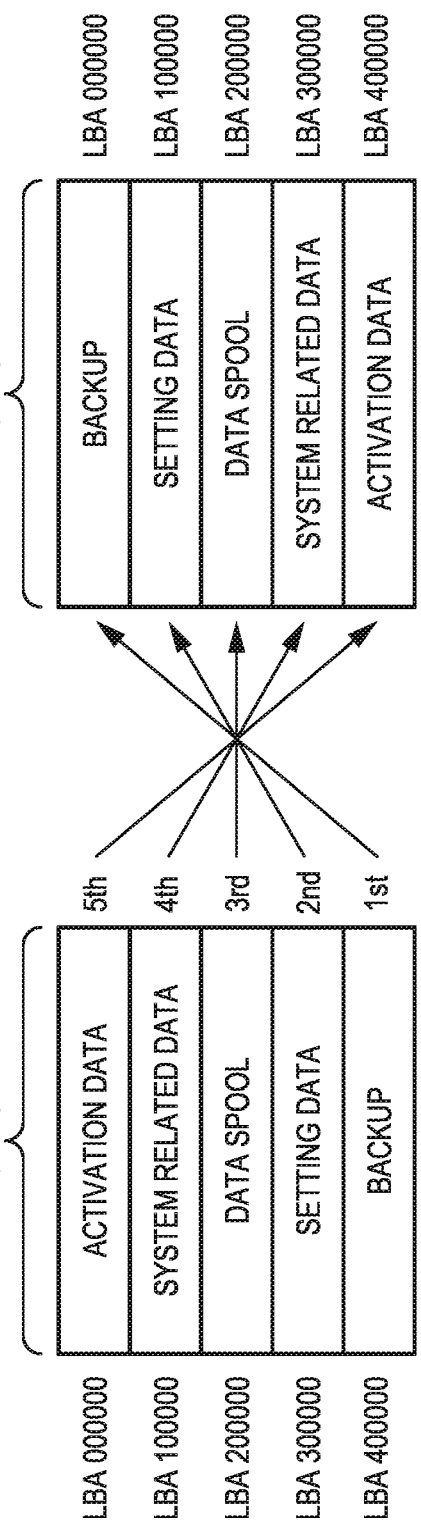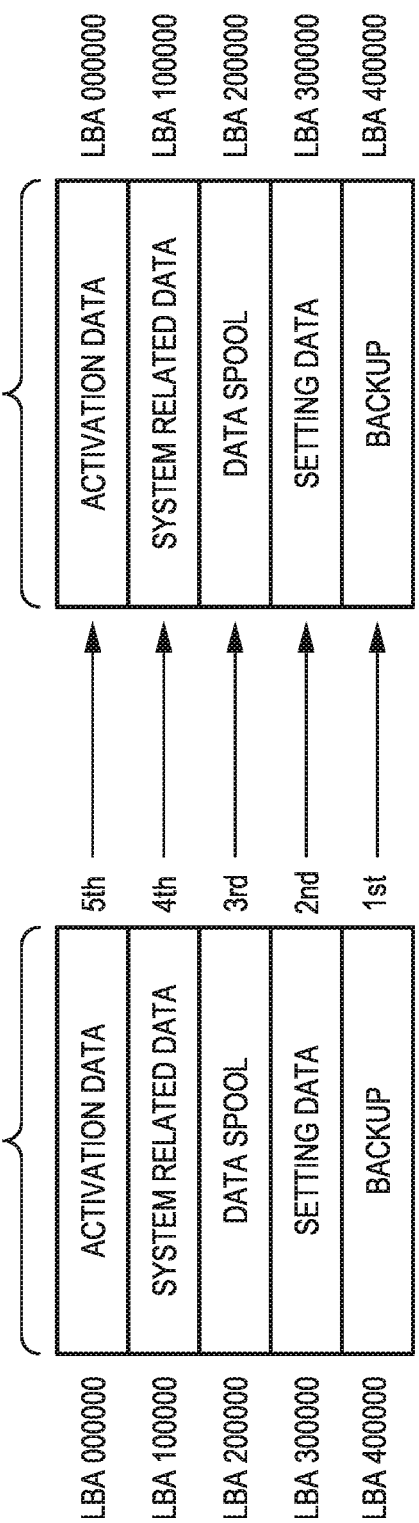

FIG 5

| HOST LBA | STORAGE DEVICE A LBA | STORAGE DEVICE B LBA | PARTITION |
|---|---|---|---|
| 000000 | 000000 | 400000 | ACTIVATION DATA |
| 100000 | 100000 | 300000 | SYSTEM RELATED DATA |
| 200000 | 200000 | 200000 | DATA SPOOL |
| 300000 | 300000 | 100000 | SETTING DATA |
| 400000 | 400000 | 000000 | BACKUP |

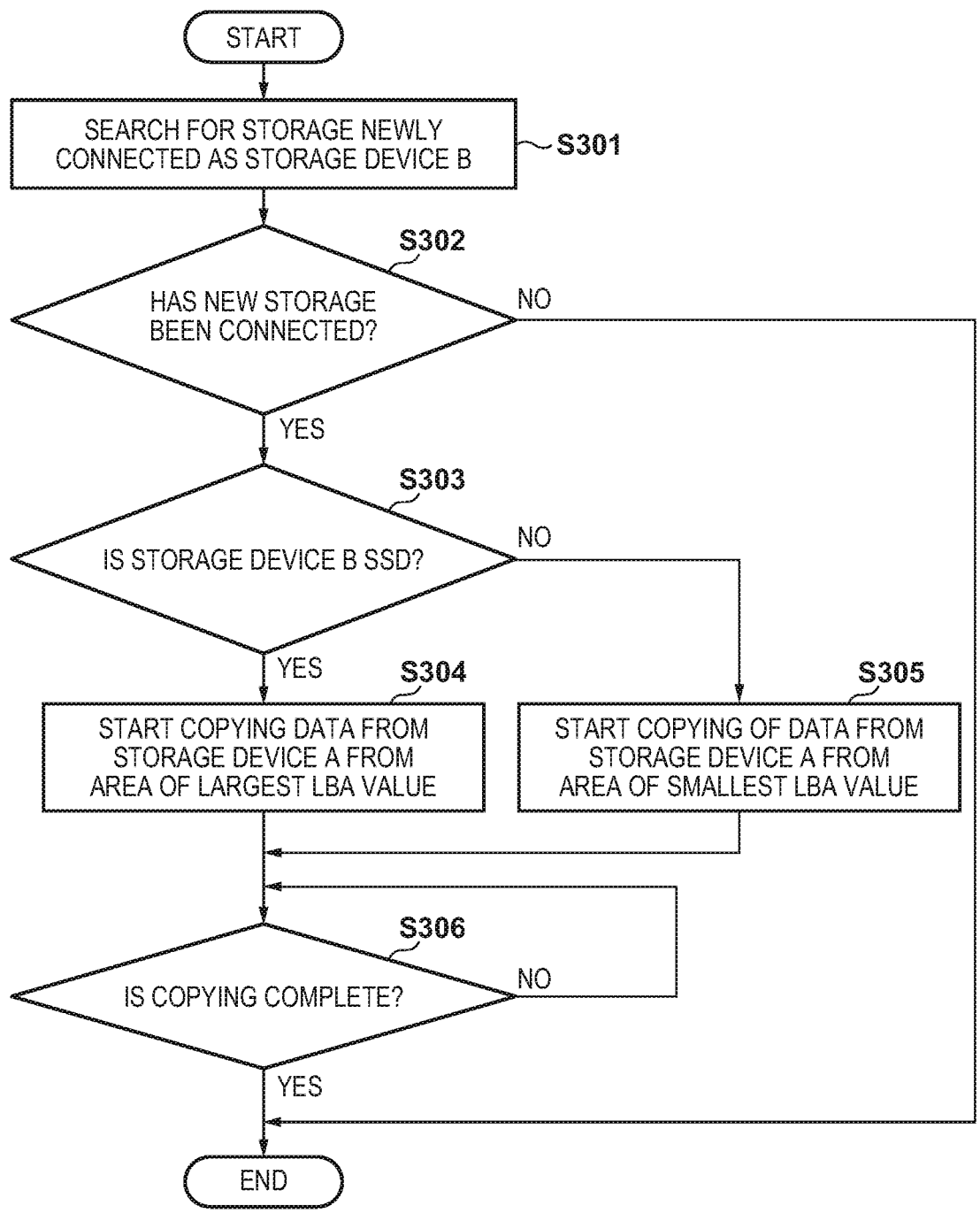

INFORMATION PROCESSING APPARATUS, METHOD OF CONTROLLING THE SAME AND STORAGE MEDIUM

BACKGROUND OF THE INVENTION

Field of the Invention

The present invention relates to an information processing apparatus such as an image forming apparatus, a method of controlling the same, and a storage medium.

Description of the Related Art

To improve the reliability of data saved in a storage device, an image forming apparatus provided with a RAID 1 (mirroring) system for improving the reliability of data by holding the same data in two storages is known (for example, Japanese Patent Laid-Open No. 2006-252451). In a mirroring system, when one storage has malfunctioned, it is possible to restore data by replacing the malfunctioning storage with a new storage.

In addition, the mirroring system sets one of the two storages as a master, sets the other as a slave, and controls writing and reading of data. Specifically, the mirroring system writes data to both of the master and slave storages, and reads data from one storage while holding the same data in the two storages. In a case where a new storage is connected (installed) to the slave side, processing for copying data from the master storage to the slave storage (rebuild processing) is performed in order to cause the two storages to hold the same data.

In a mirroring system as described above, there are cases in recent years where an SSD is used, rather than just HDDs being used as each storage. Typically, because an SSD is configured by a flash memory (a semiconductor memory), it has a higher data transfer speed than an HDD, but it has restrictions on a rewrite count for data and a holding period. In Japanese Patent Laid-Open No. 2012-79100, in order to handle restrictions on the data rewrite count for an SSD, the reliability of mirroring control is improved by changing the SSD to a slave and changing an HDD to a master based on the data rewrite count of the SSD which was set as the master.

In addition, with an SSD, there is a need to perform a refresh operation for the SSD in order to prevent data from disappearing due to restrictions on the holding period for data, by access not being performed for a certain amount of time. It is known that the holding period in which data is held in an SSD without disappearing changes depending on the temperature of the flash memory in the SSD when data is written and when power is turned off. Specifically, the higher the temperature of the flash memory when data is written the longer the holding period is, and the lower the temperature of the flash memory when power is turned off the longer the holding period is ("SOLID STATE DRIVE (SSD) REQUIREMENTS AND ENDURANCE TEST METHOD", JEDEC JESD218B.01).

In a mirroring system that uses an SSD, when processing for rebuilding is performed with respect to an SSD that is connected to the slave side, the holding period for data by the SSD will shorten when copying (writing) data at a time when the temperature of the internal flash memory is low. As a result, when a power OFF state continues in an information processing apparatus such as an image forming apparatus where the SSD is installed after completion of copying of data to the SSD for example, there is the possibility that data will disappear in a short period. It is necessary to prevent data that is desired to be held for a long period of time, such as system data, from disappearing in a short period.

SUMMARY OF THE INVENTION

The present invention was conceived in view of the above described issues. The present invention provides a technique for lengthening a holding period of data copied to an SSD when performing rebuild processing for performing mirroring to a storage device (the SSD) which is configured by a semiconductor memory.

According to one aspect of the present invention, there is provided an information processing apparatus comprising: a first storage device; a second storage device with which mirroring of data with the first storage device is performed; and a controller that performs rebuild processing of the second storage device by copying data stored in the first storage device to the second storage device, wherein, if the second storage device is a storage device of a first type that is configured by a semiconductor memory, the controller, in the rebuild processing, copies system data of the information processing apparatus to the second storage device after copying to the second storage device data other than the system data out of data stored in the first storage device.

According to another aspect of the present invention, there is provided a method of controlling an information processing apparatus provided with a first storage device and a second storage device with which mirroring of data with the first storage device is performed, the method comprising: performing rebuild processing of the second storage device by copying data stored in the first storage device to the second storage device, wherein, if the second storage device is a storage device of a first type that is configured by a semiconductor memory, in the rebuild processing, system data of the information processing apparatus is copied to the second storage device after copying data other than the system data out of data stored in the first storage device is copied to the second storage device.

According to still another aspect of the present invention, there is provided a non-transitory computer-readable storage medium storing a computer program for causing a computer to execute a method of controlling an information processing apparatus provided with a first storage device and a second storage device with which mirroring of data with the first storage device is performed, the method comprising: performing rebuild processing of the second storage device by copying data stored in the first storage device to the second storage device, wherein, if the second storage device is a storage device of a first type that is configured by a semiconductor memory, in the rebuild processing, system data of the information processing apparatus is copied to the second storage device after copying data other than the system data out of data stored in the first storage device is copied to the second storage device.

By virtue of the present invention, it is possible to lengthen a holding period of data copied to an SSD when performing rebuild processing for performing mirroring to a storage device (the SSD) which is configured by a semiconductor memory.

Further features of the present invention will become apparent from the following description of exemplary embodiments with reference to the attached drawings.

BRIEF DESCRIPTION OF THE DRAWINGS

FIG. 4A is a conceptual view illustrating an example of copying data between storage devices (first embodiment).

FIG. 4B is a conceptual view illustrating an example of copying data between storage devices (third embodiment).

FIG. 5 is a view illustrating an example of an address conversion table (first and fourth embodiments).

FIG. 8 is a flowchart illustrating storage rebuild processing procedures (third embodiment).

DESCRIPTION OF THE EMBODIMENTS

Hereinafter, embodiments of the present invention will be described in detail with reference to the accompanying drawings. It should be noted that the following embodiments are not intended to limit the scope of the appended claims, and that not all the combinations of features described in the embodiments are necessarily essential to the solving means of the present invention.

<Image Forming Apparatus>

Figure 1A:
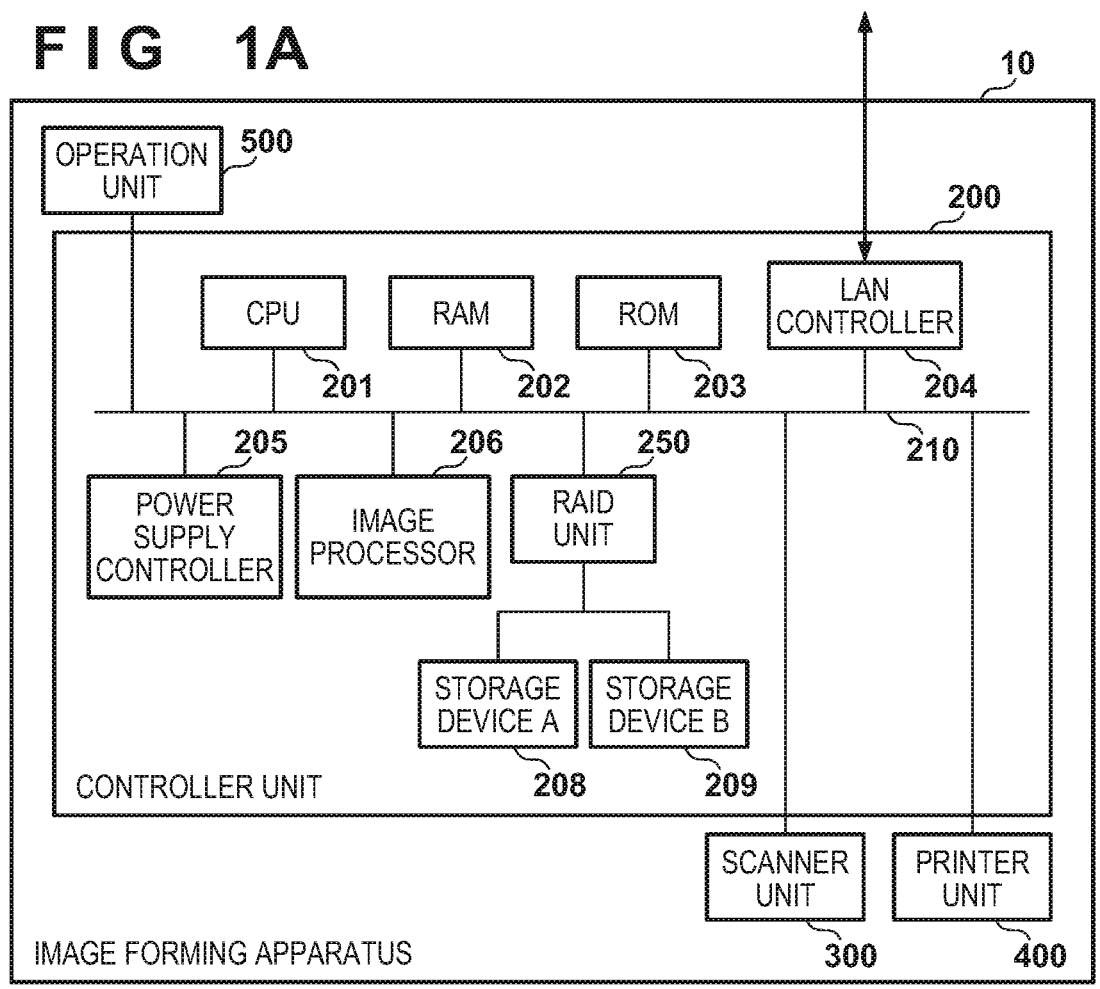
FIG. 1A is a block diagram illustrating a schematic example of a configuration of an image forming apparatus 10.

FIG. 1A is a block diagram illustrating a schematic hardware configuration example of an image forming apparatus 10. The image forming apparatus 10 is an example of an information processing apparatus of the present invention. Note that the image forming apparatus 10 may be configured by any of a printing apparatus, a printer, a copying machine, a multi-function peripheral (MFP), and a facsimile apparatus, for example, if it is installed with a mirroring system as described below. The image forming apparatus 10 is provided with a controller unit 200, and a scanner unit 300, a printer unit 400, and an operation unit 500 which are connected to the controller unit 200. The controller unit 200 is provided with a CPU 201, a RAM 202, a ROM 203, a LAN controller 204, a power supply controller 205, an image processor 206, and a RAID unit 250. The controller unit 200 is provided with a storage device A (reference numeral 208) and a storage device B (reference numeral 209) as storages that are connected to the RAID unit 250.

The power supply controller 205 controls states of supply of power to each device in the image forming apparatus 10 from a power supply. When it is powered on by the power supply controller 205, the CPU 201 reads a boot program from the ROM 203 and executes it to perform processing for activating the image forming apparatus 10. In addition, the CPU 201 loads various programs such as a control program or an application program from the storage device A which is connected to the RAID unit 250 into the RAM 202 and executes them to realize various functions of the image forming apparatus 10.

The LAN controller 204 is connected to a network such as a LAN, and communicates with an external apparatus such as a PC via the network. The CPU 201 can receive various pieces of data such as print data from an external apparatus via the LAN controller 204, for example. Note that the image forming apparatus 10 may be provided with a wireless communication interface (I/F) for performing wireless communication (wireless LAN communication or the like) with an external apparatus.

The scanner unit 300 reads an image of an original to generate image data. The scanner unit 300 transmits the generated image data to a system bus 210 via a scanner I/F 211. The printer unit 400 performs the print processing based on image data received via the system bus 210. The operation unit 500 displays an operation screen in accordance with an instruction from the CPU 201, and also notifies the CPU 201 of an instruction accepted from a user.

If print data is received from an external apparatus by the LAN controller 204, the CPU 201 temporarily saves the received print data in the storage device A via the RAM 202. Furthermore, after image processing with respect to the print data is performed by the image processor 206, the CPU 201 transmits the print data to the printer unit 400 to cause the printer unit 400 to execute print processing. In addition, in a case of realizing a copy function, the CPU 201 transmits image data generated by the scanner unit 300 to the printer unit 400 to thereby cause the printer unit 400 to execute print processing.

Figure 1B:
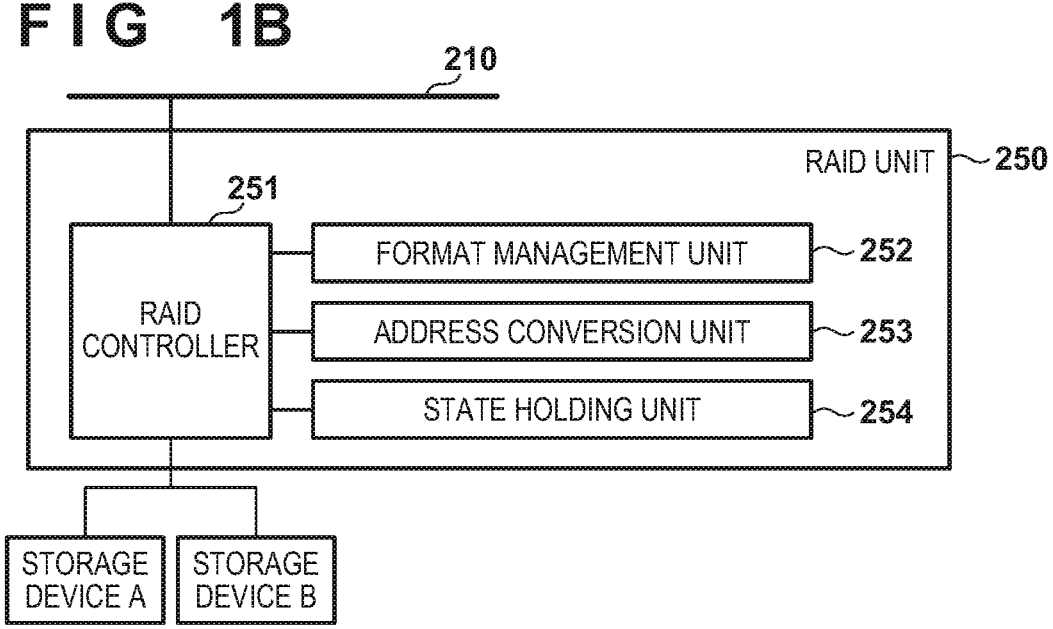
FIG. 1B is a block diagram illustrating a schematic example of a configuration of a RAID unit 250.

At least one non-volatile storage, which is used as a secondary storage device (auxiliary storage device) in the image forming apparatus 10, is connected to the RAID unit 250. FIGS. 1A and 1B illustrate an example where the image forming apparatus 10 is provided with two storages: the storage device A and the storage device B. The storage device A is a storage that is connected to a channel A of the RAID unit 250, and the storage device B is a storage that is connected to a channel B of the RAID unit 250. In the present embodiment, the storage device A and the storage device B are respectively an HDD (hard disk drive) and an SSD (solid-state drive). Note that an SSD is an example of a storage device of a first type that is configured by a semiconductor memory, and an HDD is an example of a storage device of a second type that is configured by a magnetic disk. System data necessary for activation of the system of the image forming apparatus 10 is stored in one of the storage device A and the storage device B. When the storage device in which the system data is stored is connected to the RAID unit 250, the system of the image forming apparatus 10 can be activated based on the system data.

The RAID unit 250 and the storages connected to the RAID unit 250 (the storage device A and the storage device B in FIGS. 1A and 1B) configure a RAID 1 (mirroring) system. RAID 1 is a technique for, by causing the same data to be held in two or more storages, enabling restoration of data stored in a malfunctioning storage in a case where one storage has malfunctioned. The RAID unit 250 performs mirroring control. With the configuration of FIGS. 1A and 1B, by the RAID unit 250 performing mirroring control, a plurality of storages are recognized as if they were one storage on the system bus 210 side (the CPU 201 side). Note that, it is also possible to employ a configuration where the CPU 201 performs mirroring control as in third and fourth embodiments described below.

In the case where the RAID unit 250 performs mirroring control, one of the storage device A and the storage device B is set as the master, and the other is set as the slave. In mirroring control, the RAID unit 250 writes data to both of the master storage and the slave storage when writing data, and reads data from the master storage when reading data. Note that the master storage may be connected to either channel out of the channels A and B, and in the present embodiment a case where the master storage is connected to the channel A is envisioned. In addition, the RAID unit 250 controls processing for rebuilding a newly connected storage when a slave storage is added or a malfunctioning storage is replaced, as described later.

<RAID Unit>

FIG. 1B is a block diagram illustrating an example of a configuration of the RAID unit 250. The RAID unit 250 is provided with a RAID controller 251, a format management unit 252, an address conversion unit 253, and a state holding unit 254. The RAID controller 251 uses the format management unit 252, the address conversion unit 253, and the state holding unit 254 to perform mirroring (RAID 1) between the storage device A and the storage device B that are connected to the RAID unit 250. The RAID controller 251 receives a command from the CPU 201 via the system bus 210, and executes processing for mirroring in accordance with the received command. Note that, in the case where the storage device A is connected to the channel A and the storage device B is not connected to the channel B, the RAID controller 251 transmits the command received from the CPU 201 to the storage device A unchanged.

The format management unit 252 holds management information indicating a partition configuration for respective storage areas of the storage device A and the storage device B. The state holding unit 254 holds initial values for the RAID controller 251, the format management unit 252, the address conversion unit 253 and the state holding unit 254. The state holding unit 254 also holds a type (HDD or SSD) of each storage device connected to the RAID controller 251, and holds a number of connected storage devices.

When performing mirroring, the RAID controller 251 sends, to the address conversion unit 253, an ID of the master storage (the storage device A) and an LBA (Logical Block Addressing) value indicating an area that is an access target in the storage area of the master storage. Based on information held by the format management unit 252 and the state holding unit 254, the address conversion unit 253 obtains the LBA value indicating the area for the access target in the storage area of the slave storage (the storage device B). In other words, the address conversion unit 253 converts the LBA value of the master storage (the storage device A) to a corresponding LBA value of the slave storage (the storage device B). The address conversion unit 253 sends the obtained LBA value to the RAID controller 251. Consequently, the RAID controller 251 can perform mirroring by accessing the storage area of the access target in the master storage and a corresponding storage area in the slave storage.

<State Transitions for RAID Controller>

Figure 2:
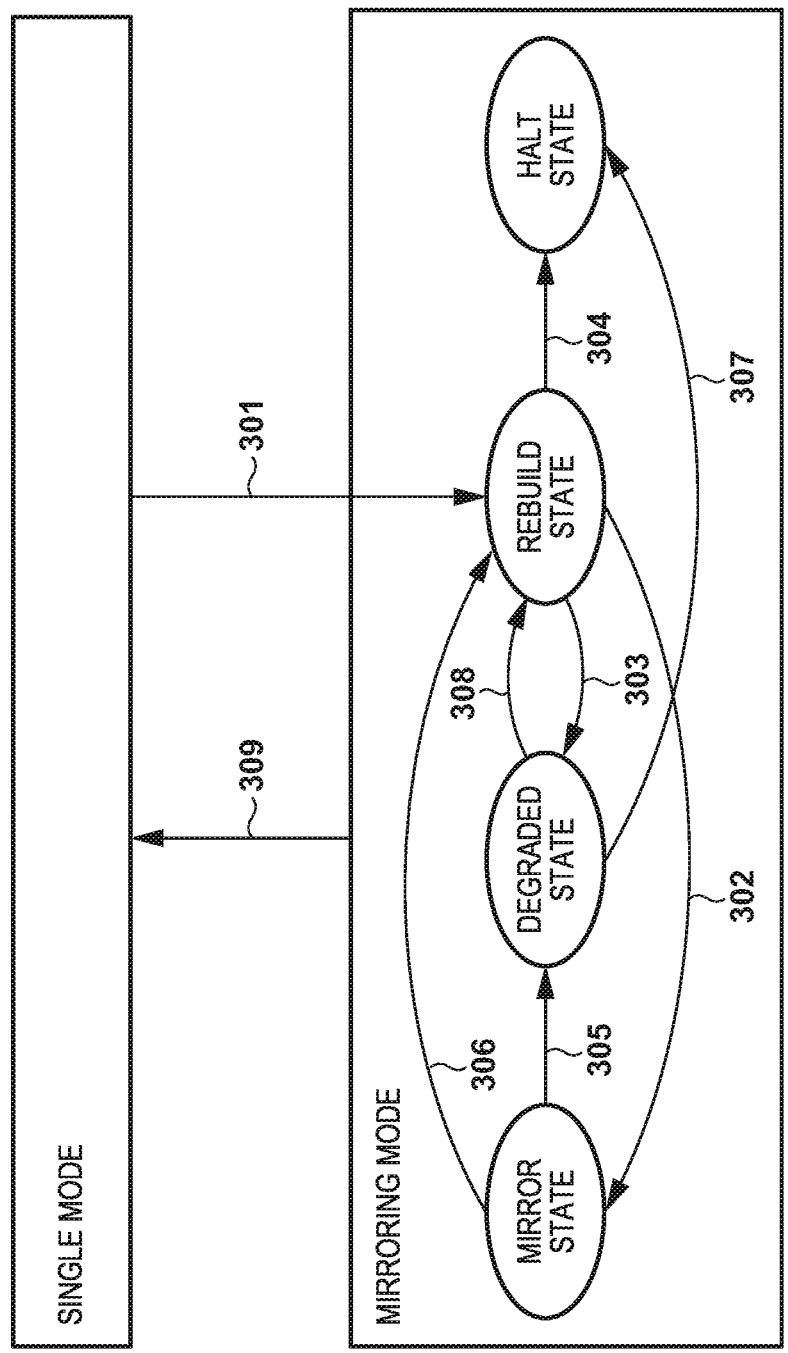
FIG. 2 is a view illustrating an example of state transitions of a RAID controller 251.

FIG. 2 is a view illustrating an example of state transitions of the RAID controller 251. The RAID controller 251 has two operation modes: a single mode and a mirroring mode. The single mode is an operation mode for using only one storage. The mirroring mode is an operation mode for using two or more storages.

In the single mode, either of the storage device A and the storage device B is connected to the RAID unit 250 (the RAID controller 251). In the mirroring mode, the RAID controller 251 sets a storage device that was connected to first as a master, and sets storage devices that are added subsequently as slaves. For example, if the storage device A is connected in the single mode, the RAID controller 251 sets the storage device A as the master when transitioning from the single mode to the mirroring mode. The RAID controller 251 sets the storage device B to a slave when the storage device B is additionally connected.

In the mirroring mode there are four states: a mirror state, a degraded state, a rebuild state, and a halt state. When one storage is additionally connected in the single mode, the RAID controller 251 sets this storage as a slave, and transitions to the rebuild state of the mirroring mode (reference numeral 301).

The rebuild state is a state where the RAID controller 251 operates by using only the master storage, and is where copying of data from the master storage to a slave storage (processing for rebuilding the slave storage) is being performed. When the rebuild processing completes in the rebuild state, the RAID controller 251 transitions to the mirror state (reference numeral 302). In addition, in a case where the slave storage malfunctions in the rebuild state, the RAID controller 251 transitions to the degraded state (reference numeral 303), and if the master storage malfunctions in the rebuild state, the RAID controller 251 transitions to the halt state (reference numeral 304).

The mirror state is a state where the RAID controller 251 operates normally by using two storages (the master storage and the slave storage) (in other words performs mirroring between the two storages). In the mirror state, the RAID controller 251 performs reading with respect to only the master storage, and performs writing with respect to both of the master storage and the slave storage. When one storage out of the two storages malfunctions in the mirror state, the RAID controller 251 transitions to the degraded state (reference numeral 305). In addition, upon receiving an instruction to transition to the rebuild state from the CPU 201 in the mirror state, the RAID controller 251 transitions to the rebuild state (reference numeral 306).

The degraded state is a state where the RAID controller 251 operates by using only the storage that has not malfunctioned, and where access to the malfunctioning storage does not occur. When the storage that is being used in the degraded state malfunctions (in other words, a state where both of the two storages have malfunctioned), the RAID controller 251 transitions to the halt state (reference numeral 307). In addition, upon receiving an instruction to transition to the rebuild state from the CPU 201 in the degraded state, the RAID controller 251 transitions to the rebuild state (reference numeral 308). For example, after a malfunctioning storage is replaced with a new storage, a command to transition to the rebuild state is transmitted from the CPU 201 to the RAID controller 251.

The halt state is a state where the RAID controller 251 cannot continue mirroring because both of the two storages have malfunctioned. Note that, in any of the four states of the mirroring mode, the RAID controller 251 transitions from the mirroring mode to the single mode (reference numeral 309) upon accepting an instruction for transitioning to the single mode from a user.

<Processing for Rebuilding Slave Storage>

As described above, by the storage device B (a second storage device) being connected (installed) in addition to the storage device A (a first storage device), mirroring of data is performed between the storage device A and the storage device B for the image forming apparatus 10. Description is given below regarding rebuild processing executed when the storage device B is connected (installed) by taking as an example a case where the storage device A is set as the master storage and the storage device B is set as the slave storage. The rebuild processing is executed by the RAID controller 251 in the following first and second embodiments. Note that it may be executed by the CPU 201 in a case where the RAID unit 250 is not provided as in the third and fourth embodiments. In other words, the RAID controller 251 or the CPU 201 function as an example of a control unit for performing processing for rebuilding the storage device B by copying data stored in the storage device A to the storage device B.

In a case where the storage device B, which is the target of the rebuild processing, is an SSD, the holding period of data by the SSD will shorten if writing of the data is performed when the temperature of the flash memory inside the SSD is low, as described above. In contrast, the holding period of the data will lengthen the higher the temperature of the flash memory at a time of writing the data to the SSD. For this reason, it is desirable that data to be held by the SSD for a long period (for example data with a low rewrite frequency) be copied to the SSD after the temperature of the flash memory in the SSD has increased due to the flash memory rising in temperature itself. Here, the system data of the image forming apparatus 10 which is stored in the system area of the storage device A in the image forming apparatus 10 corresponds to data to be held for a long period. This system data includes system related data such as activation data necessary for activation of the system and data used by the system, for example.

Accordingly, in the present embodiment, control for the rebuild processing is performed so that, out of the data stored in the storage device A, the system data of the image forming apparatus 10 is copied to the storage device B (SSD) at as late a timing as possible after the start of the rebuild processing. Specifically, if the storage device B is an SSD, in the rebuild processing, out of data stored in the storage device A, the system data is copied to the storage device B after data other than the system data of the image forming apparatus 10 is copied to the storage device B. In other words, out of data to be copied to the storage device B from the storage device A, the system data is copied at a timing later than for other data (for example, last). Consequently, in the rebuild processing that is executed after activation of the image forming apparatus 10, it is possible to copy the system data from the storage device A to the storage device B after the temperature of the flash memory in the storage device B (SSD) has increased. As a result, even in a case where a situation such as a power OFF state continuing for the image forming apparatus 10 occurs, for example, it is possible to prevent the system data from disappearing from the storage device B in a short period.

Description is given below regarding first through fourth embodiments as concrete examples of the rebuild processing described above. Note that storage devices having storage capacities greater than or equal to a certain capacity necessary for operation of the system of the image forming apparatus 10 are used for the storage device A and the storage device B. In addition, for each storage device, it is not necessarily the case that the entire capacity is used by the system, and a portion of the capacity set in advance for the system may be used.

First Embodiment

In the first embodiment, if the storage device B is an SSD, the RAID controller 251, in rebuild processing, copies to the storage device B data stored in each area in an order from an area of a final portion to an area of a head portion within a storage area of the storage device A. Consequently, the system data which is stored in an area of the head portion within the storage area of the storage device A is copied last out of data stored in the storage device A. Accordingly, it is possible to copy the system data to the storage device B after the temperature of the flash memory in the storage device B has increased.

<Rebuild Processing Procedure>

Figure 3:
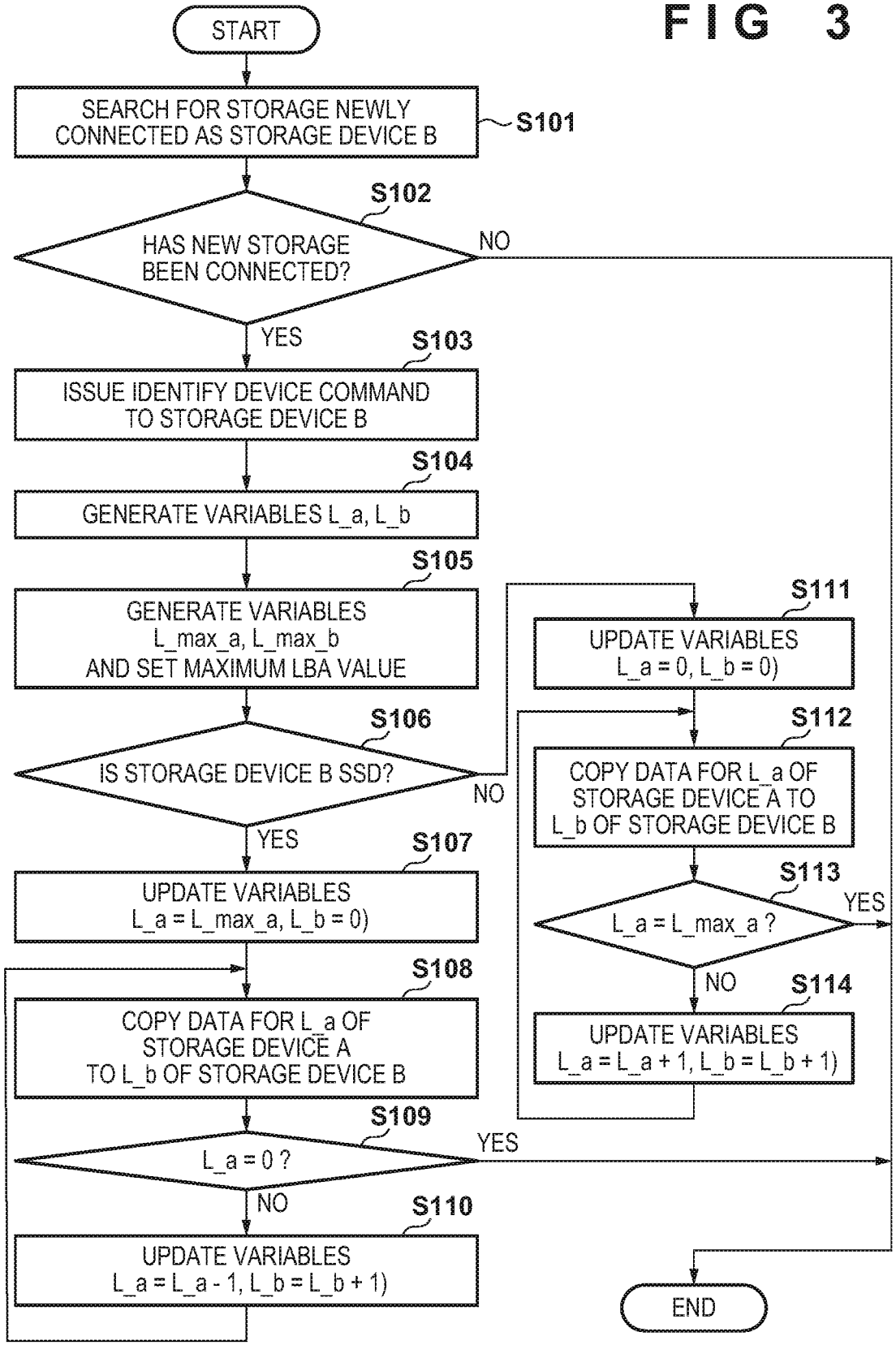
FIG. 3 is a flowchart illustrating storage rebuild processing procedures (first and fourth embodiments).

FIG. 3 is a flowchart illustrating a procedure for processing for rebuilding the slave storage (the storage device B) in the first embodiment. The processing of each step of FIG. 3 is executed by the RAID controller 251 under control by the CPU 201. If the image forming apparatus 10 is activated, the RAID controller 251 executes processing in accordance with the procedure of FIG. 3.

Firstly, the RAID controller 251, in step S101, searches for storage newly connected to the RAID unit 250 as the storage device B, and, in step S102, determines whether or not a new storage has been connected as the storage device B. If a new storage has not been connected ("NO" in step S102), the RAID controller 251 ends the processing in accordance with the procedure of FIG. 3, and makes a transition to the single mode where it operates using the storage device A. Meanwhile, if a new storage has been connected ("YES" in step S102), the RAID controller 251 advances the processing to step S103.

In step S103, the RAID controller 251 issues an identify device command to each of the storage device A and the storage device B. With this, the RAID controller 251 receives from each storage device a response to the identify device command, and obtains device information of each storage device from the responses. The device information includes rotation number information and a maximum LBA value for the corresponding storage device, for example.

Next, in step S104, the RAID controller 251 generates (in the state holding unit 254) variables L_a and L_b respectively corresponding to the storage device A and the storage device B, for the processing for rebuilding the storage device B. The variables L_a and L_b are used to hold LBA values. In addition, in step S105, the RAID controller 251 generates (in the state holding unit 254) variables L_max_a and L_max_b that respectively correspond to the storage device A and the storage device B. Furthermore, the RAID controller 251 sets (assigns) the maximum LBA value of the storage device A to the variable L_max_a and sets (assigns) the maximum LBA value of the storage device B to the variable L_max_b, based on the device information obtained in step S103.

Subsequently, in step S106, the RAID controller 251 determines the type of the storage device B based on the device information obtained in step S103. For example, if rotation number information included in the device information indicates a predetermined number of rotations, it can be determined that the storage device B is an HDD (a storage device of a second type that is configured by a magnetic disk). For example, if rotation number information included in the device information indicates media that does not rotate, it can be determined that the storage device B is an SSD (a storage device of a first type that is configured by a semiconductor memory). The RAID controller 251 determines whether or not the storage device B is an SSD, and advances the processing to step S107 if the storage device B is an SSD ("YES" in step S106), and advances the processing to step S107 if the storage device B is an HDD ("NO" in step S106).

Note that configuration may be taken to obtain SMART (Self Monitoring Analysis and Reporting Technology) information of the storage device from the storage device B, and determine the type of the storage device B based on the obtained information. Alternatively the type of the storage device B may be determined based on information such as a model number or a model name of the storage device that is registered in advance in the image forming apparatus 10.

(If the Storage Device B is an SSD)

If the storage device B is an SSD, in step S107, the RAID controller 251 updates the variables $L\_a$ and $L\_b$ as follows, and advances the processing to step S108.

$$L\_a = L\_\max\_a$$

$$L\_b = 0$$

Consequently, the maximum LBA value of the storage device A is set to the variable $L\_a$, and the minimum LBA value of the storage device B (in other words 0) is set to the variable $L\_b$. The minimum LBA value corresponds to the area of the head portion within the storage area of a respective storage device, and is an address allocated to the area for the head portion. The maximum LBA value corresponds to the area of a final portion within the storage area of a respective storage device, and is an address allocated to the area for the final portion.

In step S108, the RAID controller 251 copies data stored in an area corresponding to the variable $L\_a$ (an LBA value) in the storage device A to the area corresponding to the variable $L\_b$ (an LBA value) in the storage device B. In this way, the variable $L\_a$ indicates an LBA value corresponding to an area for a data copy source in storage device A, and the variable $L\_b$ indicates an LBA value corresponding to an area for a data copy destination in storage device B.

Subsequently, in step S109, the RAID controller 251 determines whether or not the variable $L\_a$ is equal to 0 (whether or not $L\_a$ is the minimum LBA value), and if $L\_a$ is not equal to 0, the RAID controller 251 advances the processing to step S110. In step S110, the RAID controller 251 updates the variables $L\_a$ and $L\_b$ as follows.

$$L\_a = L\_a - 1$$

$$L\_b = L\_b + 1$$

In other words, the RAID controller 251 causes the variable $L\_a$ to decrease by 1, and causes the variable $L\_b$ to increase by 1. By this processing, copy source areas in the storage device A are set in an order from an area corresponding to the maximum LBA value to an area corresponding to the minimum LBA value. In addition, copy destination areas in the storage device B are set in an order from an area corresponding to the minimum LBA value to an area corresponding to the maximum LBA value.

After the update of the variables $L\_a$ and $L\_b$ in step S110, the RAID controller 251 returns the processing to step S108. Consequently, the RAID controller 251 again copies data from the storage device A to the storage device B, targeting subsequent areas in the storage device A and the storage device B respectively indicated by the variables $L\_a$ and $L\_b$. By repeating the processing of step S108 through step S110 in this way, the RAID controller 251 copies data stored in the entire storage area of the storage device A to the storage device B.

Specifically, the RAID controller 251 reads data stored in each area, in an order from an area corresponding to the maximum LBA value (an area for a final portion) to an area corresponding to the minimum LBA value (an area for the head portion) within the storage area of the storage device A. Furthermore, the RAID controller 251 writes the data read in order from the storage device A, in each area in an order from the area corresponding to the minimum LBA value (the area of the head portion) to the area corresponding to the maximum LBA value (the area of the final portion) within the storage area of the storage device B.

In step S109, the RAID controller 251 ends the processing in accordance with the procedure of FIG. 3 if the variable $L\_a$ is equal to 0 (in other words, if copying of data stored in the area corresponding to the minimum LBA value within the storage area A to the storage area B has completed). Subsequently, the RAID controller 251 transitions to the mirror state of the mirroring mode, and starts mirroring between the storage device A and the storage device B.

Note that, when the rebuild processing completes, the RAID controller 251 generates an address conversion table (FIG. 5) which is described later, and, based on the address conversion table, performs access control to the storage device B in accordance with an LBA value used with respect to the storage device A. Note that the address conversion table indicates correspondence relationships between LBA values (addresses) respectively allocated to areas of the storage device B and areas of the storage device A where the same data is stored. The address conversion table is used to convert an LBA value (an address) used for the storage device A to an LBA value (an address) used for the storage device B.

(If the Storage Device B is an HDD)

If the storage device B is an HDD, in step S111, the RAID controller 251 updates the variables $L\_a$ and $L\_b$ as follows, and advances the processing to step S112.

$$L\_a = 0$$

$$L\_b = 0$$

Consequently, the minimum LBA value (in other words, 0) of the storage device A is set to the variable $L\_a$, and the minimum LBA value of the storage device B (in other words 0) is set to the variable $L\_b$. In step S112, similarly to in step S108, the RAID controller 251 copies data stored in an area corresponding to the variable $L\_a$ (an LBA value) in the storage device A to the area corresponding to the variable $L\_b$ (an LBA value) in the storage device B.

Next, in step S113, the RAID controller 251 determines whether or not the variable $L\_a$ is equal to $L\_\max\_a$ (whether or not $L\_a$ is the maximum LBA value), and advances the processing to step S114 if $L\_a$ is not equal to $L\_\max\_a$. In step S114, the RAID controller 251 updates the variables $L\_a$ and $L\_b$ as follows.

$$L\_a = L\_a + 1$$

$$L\_b = L\_b + 1$$

In other words, the RAID controller 251 causes the variable $L\_a$ to decrease by 1, and causes the variable $L\_b$ to increase by 1. By this processing, copy source areas in the storage device A are set in an order from an area corresponding to the minimum LBA value to an area corresponding to the maximum LBA value. In addition, copy destination areas in the storage device B are set in an order from an area corresponding to the minimum LBA value to an area corresponding to the maximum LBA value.

After the update of the variables $L\_a$ and $L\_b$ in step S114, the RAID controller 251 returns the processing to step S111. Consequently, the RAID controller 251 again copies data from the storage device A to the storage device B, with targeting subsequent areas in the storage device A and the storage device B respectively indicated by the variables $L\_a$ and $L\_b$. By repeating the processing of step S111 through step S114 in this way, the RAID controller 251 copies data stored in the entire storage area of the storage device A to the storage area B.

Specifically, in reverse to the case where the storage device B is an SSD, the RAID controller 251 reads data stored in each area in an order from an area corresponding to the minimum LBA value within the storage area of the storage device A to an area corresponding to the maximum LBA value. Furthermore, the RAID controller 251 writes the data read in order from the storage device A in an order from the area corresponding to the minimum LBA value to the area corresponding to the maximum LBA value within the storage area of the storage device B.

In step S113, the RAID controller 251 ends the processing in accordance with the procedure of FIG. 3 if the variable L_a is equal to L_max_a (in other words, if copying of data stored in the area corresponding to the maximum LBA value in the storage device A to the storage device B has completed). Subsequently, the RAID controller 251 transitions to the mirror state of the mirroring mode, and starts mirroring between the storage device A and the storage device B.

<Rebuild Processing Example>

FIG. 4A is a conceptual view that illustrates an example of copying data from the storage device A to the storage device B in the rebuild processing of the present embodiment. In the present example, the storage device A is an HDD, and the storage device B is an SSD.

The HDD used as the storage device A is typically provided with disc-shaped magnetic disks referred to as a platter, and the disks rotate at high speed inside the HDD. In the HDD, there is a difference in data transfer speed between an outer peripheral portion of the disk and an inner peripheral portion. Because the outer peripheral portion of the disk has a longer circumference than an inner peripheral portion, it has more sectors, and has a higher data transfer speed than the inner peripheral portion. In addition, a low LBA value is allocated to the outer peripheral portion of the disk (in other words, the outer peripheral portion corresponds to the head portion of the storage area), and a large LBA value is allocated to the inner peripheral portion (in other words, the inner peripheral portion corresponds to the final portion of the storage area). For this reason, improvement of system capabilities is allowed by storing system data (in FIG. 4A, activation data and system related data), which influences activation time for the system, in an area corresponding to a small LBA value in the storage device A.

Meanwhile, the SSD used as the storage device B is configured by not a magnetic disk but a semiconductor memory. For this reason, the capacity of the image forming apparatus 10 is constant independently of an area (in other words, an LBA value) where system data is stored in the SSD. In the rebuild processing of the present embodiment, data read from the storage device A is written in an order from an area corresponding to the minimum LBA value to an area corresponding to the maximum LBA value within the storage area of the storage device B.

If an SSD is connected as the storage device B, as illustrated by FIG. 4A, data stored in respective areas is read in an order from an area corresponding to the maximum LBA value (the area for the final portion) to an area corresponding to the minimum LBA value (the area for the head portion) within the storage area of the storage device A. Data read in order from the storage device A is written in an order from an area corresponding to the minimum LBA value (the area for the head portion) to an area corresponding to the maximum LBA value (the area for the final portion) within the storage area of the storage device B.

By such rebuild processing, the system data (activation data and system related data) is ultimately copied from the storage device A to the storage device B. Accordingly, it is possible to copy the system data in a state where the temperature of the SSD has increased, due to the SSD itself increasing in temperature while copying of data other than the system data is performed.

<Address Conversion Table>

As a result of the rebuild processing described above, partition configurations differ between the storage device A and the storage device B as illustrated by FIG. 4A. FIG. 5 is an address conversion table (a partition table) used after the completion of the rebuild processing. The CPU 201 uses a host LBA value, indicated in FIG. 5, to designate an access target area in a storage device. The host LBA value corresponds to the LBA value of the storage device A (HDD) for each area, but does not correspond to an LBA value of the storage device B (SSD) due to the differences in partition configurations. Accordingly, to realize access to the storage device B using a host LBA value, it is necessary to perform an LBA conversion (address conversion) from a host LBA value to an LBA value for the storage device B in the RAID unit 250.

In the present embodiment, the address conversion table illustrated in FIG. 5 is generated by the RAID controller 251 after the completion of the rebuild processing. The generated address conversion table is held by the state holding unit 254, and is used for an address conversion by the address conversion unit 253 when access to a storage device from the CPU 201 occurs. Based on an address conversion using the address conversion table by the address conversion unit 253, the RAID controller 251 performs access control to the storage device B in accordance with an LBA value that corresponds to a host LBA value and is an LBA value used with respect to the storage device A.

As described above, in the present embodiment, in a case where an SSD is a target of the rebuild processing, system data stored in an area (a system area or the like) corresponding to a small LBA value in a copy source storage device (an HDD) is written to the copy destination (the SSD) at a final stage of the rebuild processing. When writing (copying) of the system data is started, it is expected that the temperature of the SSD will have increased. In other words, the system data is written to the SSD in a state where the temperature of the SSD is high. Consequently, it is possible to lengthen the period (the retention period) in which the written data is held by the SSD over a case where the system data is written in a state where the temperature of the SSD is low. As a result, even in a case where a situation such as a power OFF state continuing for the image forming apparatus 10 occurs, for example, it is possible to prevent the system data from disappearing from the SSD in a short period.

Second Embodiment

In the second embodiment, the RAID controller 251 successively copies all data from the storage device A to the storage device B twice in the rebuild processing if the storage device B is an SSD. Specifically, after copying all data stored in the storage device A to the storage device B, the RAID controller 251 copies all data stored in the storage device A to the storage device B again. In other words, after the temperature of the flash memory in the storage device B has increased while all of the data is copied from the storage device A to the storage device B, the system data is written to the storage device B again. Accordingly, it is possible to lengthen the holding period of the system data by the storage device B. Description is given below mainly on differences with the first embodiment.

<Rebuild Processing Procedure>

Figure 6:
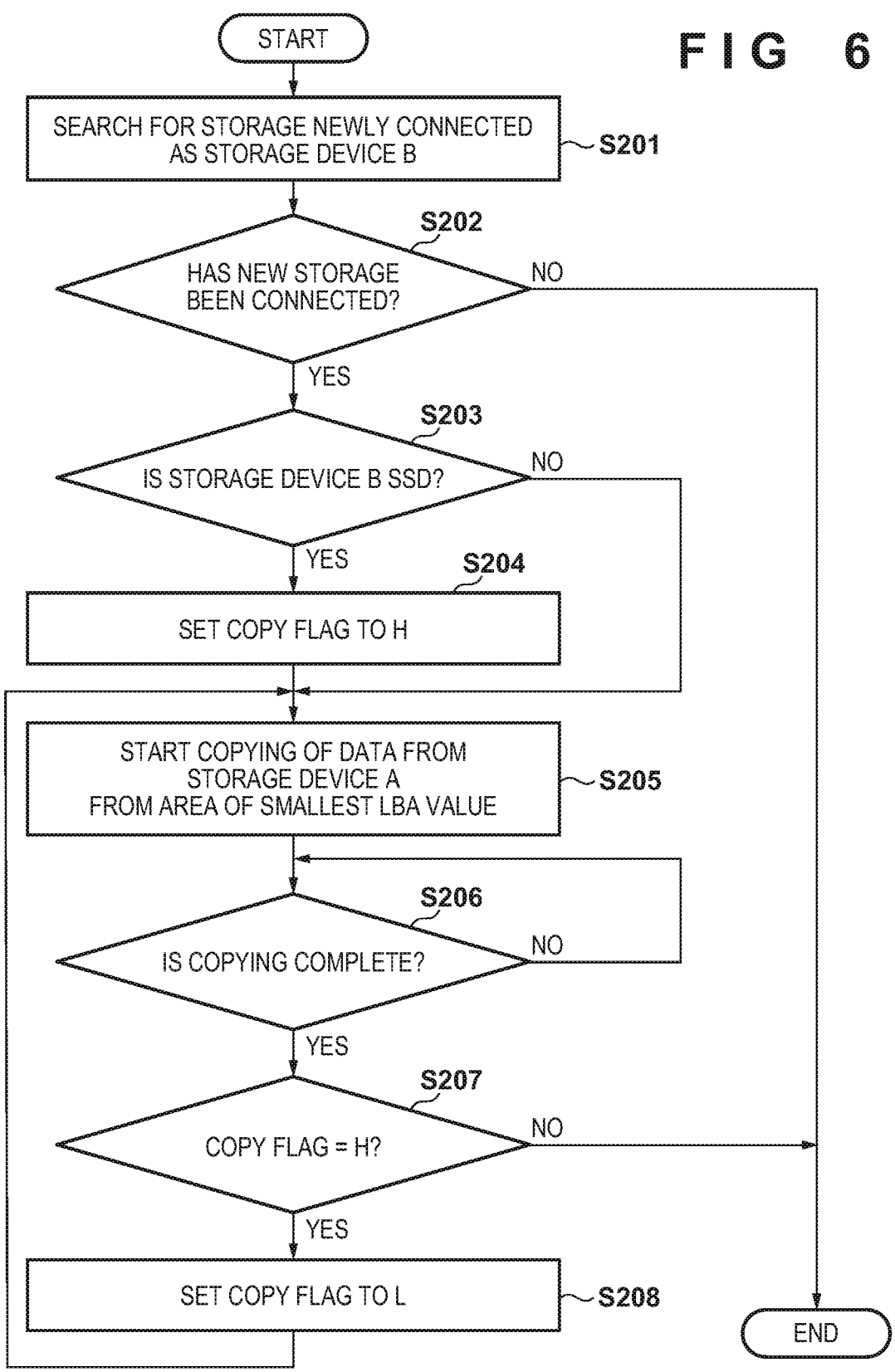
FIG. 6 is a flowchart illustrating storage rebuild processing procedures (second embodiment).

FIG. 6 is a flowchart illustrating a procedure for processing for rebuilding the slave storage (the storage device B) in the second embodiment. The processing of each step of FIG. 6 is executed by the RAID controller 251 under control by the CPU 201. When the image forming apparatus 10 is activated, the RAID controller 251 executes processing in accordance with the procedure of FIG. 6.

Firstly, step S201 and step S202 are similar to step S101 and step S102 (FIG. 3) of the first embodiment. If a new storage has not been connected ("NO" in step S202), the RAID controller 251 ends the processing in accordance with the procedure of FIG. 6, and makes a transition to the single mode where it operates using the storage device A. Meanwhile, if a new storage has been connected ("YES" in step S202), the RAID controller 251 advances the processing to step S203.

In step S203, the RAID controller 251 determines the type of the storage device B (whether the storage device B is an SSD), and advances the processing to step S204 if the storage device B is an SSD, and advances the processing to step S205 if the storage device B is an HDD. In step S204, the RAID controller 251 sets a copy flag held by the state holding unit 254 to H (high), and advances the processing to step S205. The copy flag was set in advance to L (low). In the rebuild processing, a case where the copy flag is set to H indicates that second copying should be performed after the copying of all data from the storage device A to the storage device B has completed.

In step S205, the RAID controller 251 starts copying to the storage device B in an order from data stored in an area corresponding to the minimum LBA value of the storage device A. Data read from the storage device A is written in an order from an area corresponding to the minimum LBA value of the storage device B. Subsequently, in step S206, when the RAID controller 251 completely copies all data from the storage device A to the storage device B, the RAID controller 251 advances the processing to step S207.

In step S207, the RAID controller 251 determines whether or not the copy flag held by the state holding unit 254 is set to H (high). If the copy flag is not set to H, the RAID controller 251 ends the processing in accordance with the procedure of FIG. 6, makes a transition to the mirror state of the mirroring mode, and starts mirroring between the storage devices. Meanwhile, if the copy flag is set to H in in step S207, the RAID controller 251 advances the processing to step S208.

In step S208, the RAID controller 251 sets the copy flag held by the state holding unit 254 to L, and returns the processing to step S205. In step S205 and step S206, the RAID controller 251 copies the data from the storage device A to the storage device B again. Subsequently, in step S207, because the copy flag is set to L, the RAID controller 251 ends the processing in accordance with the procedure of FIG. 6, makes a transition to the mirror state, and starts mirroring between the storage devices. In this way, copying of data from the storage device A to the storage device B is limited to two times in accordance with the setting of the copy flag. Consequently, it is possible to prevent an increase to an excessive number of writes to the storage device B (SSD) and prevent an increase in power consumption that accompanies the copying of data.

As described above, in the present embodiment, if an SSD is a target of rebuild processing, copying of data from the copy source storage device to the SSD is performed twice, successively. Consequently, it is expected that the temperature of the SSD will have increased when the second copying is performed for the system data. In other words, the system data is written to the SSD in a state where the temperature of the SSD is high. Consequently, similarly to in the first embodiment, it is possible to lengthen the retention period of system data by the SSD, and it is possible to prevent system data from disappearing from the SSD in a short period, even in a case where a situation such as a power OFF state continuing for the image forming apparatus 10 occurs, for example.

In addition, in the present embodiment, the RAID controller 251 stores the same data in areas corresponding to the same LBA values for the storage device A and the storage device B. Consequently, the RAID controller 251 can perform access control with respect to the storage device B without needing an address conversion table as in the first embodiment.

Note that various changes are possible for the present embodiment. For example, processing described above can be executed by the CPU 201 instead of by the RAID controller 251. In addition, the RAID controller 251 may start mirroring between the storage devices when copying of data to the SSD completes for the first time in the rebuild processing. This is because a stage where copying of data completes the first time is a state where it is possible to start mirroring between the storage devices. Consequently, while the time required for the rebuild processing to complete lengthens due to copying of data twice, it is possible to start mirroring between the storage device early, before the completion of the rebuild processing.

In addition, in the rebuild processing, after copying all the data stored in the storage device A to the storage device B, the RAID controller 251 may copy only the system data to the storage device B again instead of all the data stored in the storage device A. Consequently, it is possible to omit copying of data the second time for data other than the system data that has a comparatively high frequency of rewrites, and it is possible to complete the copying of data the second time in a shorter amount of time. In addition, it is possible to prevent increasing the number of writes of data to the SSD that accompanies the copying of the data other than the system data.

Third Embodiment

In the first and second embodiments, by performing RAID 1 between the storage device A and the storage device B by the RAID unit 250, the CPU 201 can use the RAID unit 250 to access a storage device without needing to recognize the configuration of the storage device(s). In the third embodiment, description is given regarding processing for rebuilding the storage device B in a case where the CPU 201 performs a software RAID without the RAID unit 250. Description is given below mainly on differences with the first embodiment.

<Image Forming Apparatus>

Figure 7:
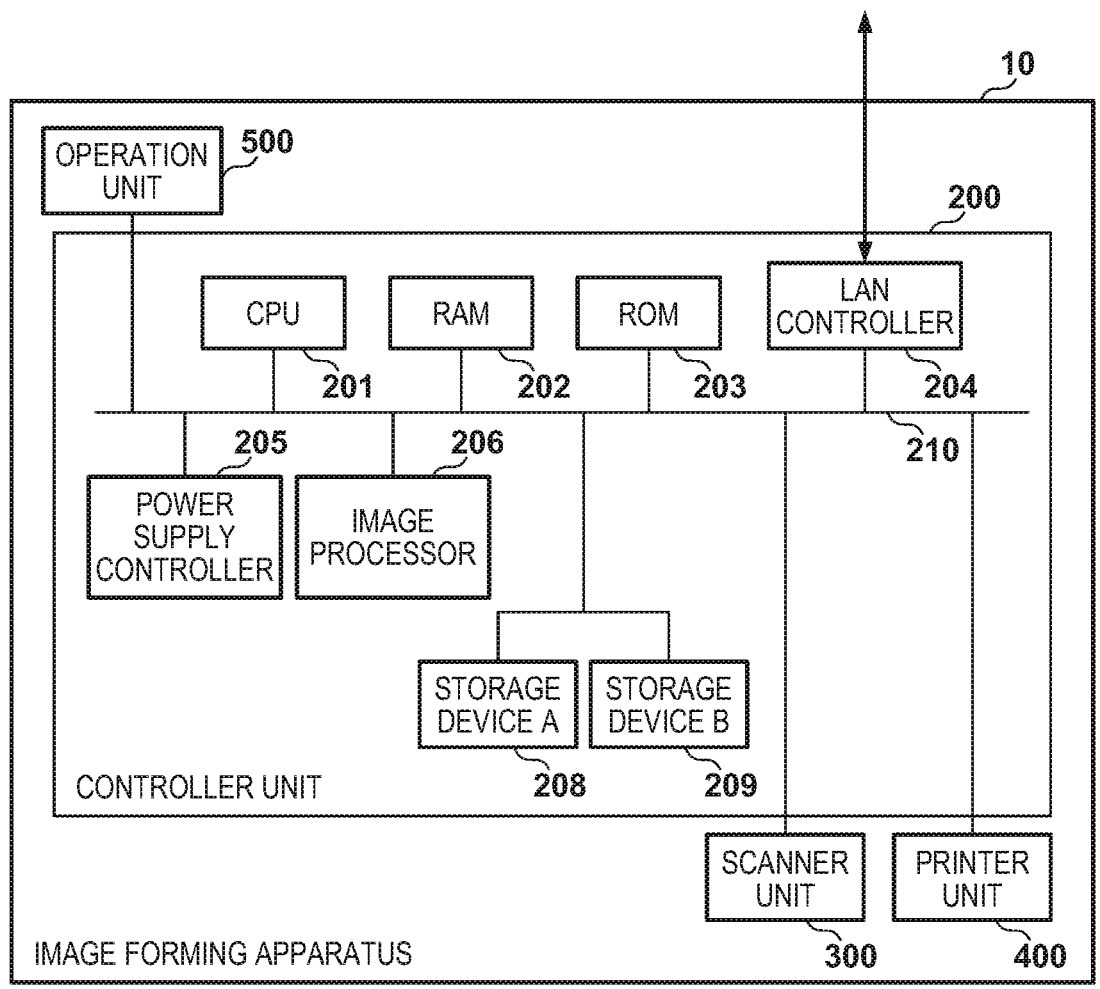
FIG. 7 is a block diagram illustrating a schematic example of a configuration of an image forming apparatus 10 (third embodiment).

FIG. 7 is a block diagram illustrating a schematic hardware configuration example of the image forming apparatus 10 in the present embodiment. The image forming apparatus 10 of the present embodiment, as illustrated by FIG. 7, differs from the first embodiment (FIG. 1A) in that the controller unit 200 is not provided with the RAID unit 250. For this reason, in the present embodiment, the CPU 201 directly accesses the storage device A (reference numeral 208) and the storage device B (reference numeral 209) via the system bus 210.

<Rebuild Processing Procedure>

In the present embodiment, if the storage device B is an SSD, the CPU 201, in rebuild processing, copies to the storage device B data stored in each area in an order from an area of a final portion to an area of a head portion within the storage area of the storage device A. Consequently, the system data which is stored in an area of the head portion within the storage area of the storage device A is copied last out of data stored in the storage device A. Accordingly, it is possible to copy the system data to the storage device B after the temperature of the flash memory in the storage device B has increased.

FIG. 8 is a flowchart illustrating a procedure for processing for rebuilding the slave storage (the storage device B) in the third embodiment. The processing of each step of FIG. 8 is executed by the CPU 201. The CPU 201 can realize the processing of each step by loading a control program stored in the ROM 203 into the RAM 202 and executing it. In the present embodiment, when the image forming apparatus 10 activates, the CPU 201 executes processing in accordance with the procedure of FIG. 8.

Firstly, step S301 and step S302 are similar to step S101 and step S102 (FIG. 3) of the first embodiment except for the point that the CPU 201 executes processing instead of the RAID controller 251. In step S302, if a new storage has not been connected ("NO" in step S302), the CPU 201 ends the processing in accordance with the procedure of FIG. 8, and makes a transition to the single mode where it operates using the storage device A. Meanwhile, if a new storage has been connected ("YES" in step S302), the CPU 201 advances the processing to step S303.

In step S303, the CPU 201 determines the type of the storage device B (whether the storage device B is an SSD), and advances the processing to step S304 if the storage device B is an SSD, and advances the processing to step S305 if the storage device B is an HDD. In step S304, the CPU 201 starts copying to the storage device B in an order from data stored in an area corresponding to the maximum LBA value of the storage device A, and then advances the processing to step S306. Meanwhile, in step S305, the CPU 201 starts copying to the storage device B in an order from data stored in an area corresponding to the minimum LBA value of the storage device A, and advances the processing to step S306. In step S306, if copying of all data from the storage device A to the storage device B completes, the CPU 201 ends the processing in accordance with the procedure of FIG. 8, transitions to the mirror state of the mirroring mode, and starts mirroring between the storage devices.

<Rebuild Processing Example>

FIG. 4B is a conceptual view that illustrates an example of copying data from the storage device A to the storage device B in the rebuild processing of the present embodiment. In the present example, the storage device A is an HDD, and the storage device B is an SSD. In the present embodiment, if an SSD is connected as the storage device B, data stored in respective areas is read in an order from an area corresponding to the maximum LBA value (the area for the final portion) to an area corresponding to the minimum LBA value (the area for the head portion) in the storage area of the storage device A. Data read in order from the storage device A is written in an order from an area corresponding to the maximum LBA value (the area for the final portion) to an area corresponding to the minimum LBA value (the area for the head portion) in the storage area of the storage device B.

As described above, in the present embodiment, similarly to in the first embodiment, in a case where an SSD is a target of rebuild processing, system data stored in an area corresponding to a small LBA value in the copy source storage device is written to the copy destination (the SSD) in the final stage of the rebuild processing. Consequently, even in a case where the CPU 201 executes a software RAID, it is possible to lengthen the retention period of system data by the SSD. In addition, even in a case where a situation such as a power OFF state continuing for the image forming apparatus 10 occurs, for example, it is possible to prevent the system data from disappearing from the SSD in a short period.

Fourth Embodiment

In the fourth embodiment, similarly to in the third embodiment, description is given regarding processing for rebuilding the storage device B in a case where the CPU 201 performs a software RAID without the RAID unit 250. Description is given below mainly on differences with the first embodiment.

The image forming apparatus 10 in the present embodiment, similarly to the third embodiment, has the configuration illustrated in FIG. 7 and does not have the RAID unit 250. For this reason, the CPU 201 directly accesses the storage device A (reference numeral 208) and the storage device B (reference numeral 209) via the system bus 210. If the RAID unit 250 is not present, the rebuild processing (FIG. 3) of the first embodiment can be executed by the CPU 201 instead of the RAID controller 251.

The procedure for the rebuild processing of the present embodiment is similar to that of the first embodiment (FIG. 3). However, for the present embodiment, the processing of each step is executed by not the RAID controller 251 but the CPU 201. In such a case, for the variables L_a, L_b, L_max_a, and L_max_b, storage areas corresponding to each variable are reserved in the RAM 202, for example.

In the present embodiment, an example of a partition configuration for a case where an HDD is connected as the storage device A and an SSD is connected as the storage device B is similar to that of the first embodiment (FIG. 4A). For the present embodiment, because the difference is that the processing of the RAID controller 251 is performed by the CPU 201, partitions that are configured are not changed from those of the first embodiment. In addition, in the present embodiment, an address conversion table that is used after rebuilding completes is similar to that of the first embodiment (FIG. 5). In such a case, the CPU 201 can hold the generated address conversion table in the ROM 203 which is a non-volatile memory. After activation of the image forming apparatus 10, the CPU 201 loads the address conversion table from the ROM 203 to the RAM 202, and performs access control with respect to the storage device B based on the address conversion table.

In the present embodiment, similarly to in the first embodiment, in a case where an SSD is a target of rebuild processing, system data stored in an area corresponding to a small LBA value in the copy source storage device is written to the copy destination (the SSD) in the final stage of the rebuild processing. Consequently, even in a case where the CPU 201 executes a software RAID, it is possible to lengthen the retention period of system data by the SSD. In addition, even in a case where a situation such as a power OFF state continuing for the image forming apparatus 10 occurs, for example, it is possible to prevent the system data from disappearing from the SSD in a short period.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)TM), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-136439, filed Jul. 12, 2017, which is hereby incorporated by reference herein in its entirety.

What is claimed is:

1. An information processing apparatus comprising:
a first storage device;
a second storage device with which mirroring of data with the first storage device is performed; and
a controller that performs rebuild processing of the second storage device by copying data stored in the first storage device to the second storage device,
wherein, if the second storage device is a storage device of a first type that is configured by a semiconductor memory, the controller, in the rebuild processing, copies system data used for activation of the information processing apparatus to the second storage device after copying to the second storage device data other than the system data out of data stored in the first storage device.

2. The information processing apparatus according to claim 1, wherein
the system data is stored in an area of a head portion within a storage area of the first storage device, and
if the second storage device is a storage device of the first type, the controller copies to the second storage device data stored in each area in an order from an area of a final portion to the area of the head portion within the storage area of the first storage device.

3. The information processing apparatus according to claim 2, wherein
if the second storage device is a storage device of the first type, the controller
reads data stored in each area in an order from the area of the final portion to the area of the head portion within the storage area of the first storage device, and writes the data read in order from the first storage device, in each area in an order from an area of a head portion to an area of a final portion within a storage area of the second storage device.

4. The information processing apparatus according to claim 3, wherein
the controller
after completing the rebuild processing, generates a conversion table that indicates correspondence between addresses respectively allocated to an area of the first storage device and an area of the second storage device where the same data is stored, and that is for converting an address used for the first storage device to an address used for the second storage device, and
performs access control with respect to the second storage device in accordance with the address used for the first storage device, based on the conversion table.

5. The information processing apparatus according to claim 2, wherein
if the second storage device is a storage device of a second type that is configured by a magnetic disk, the controller
reads data stored in each area in an order from the area of the head portion to the area of the final portion within the storage area of the first storage device, and
writes the data read in order from the first storage device, in each area in an order from an area of a head portion to an area of a final portion within storage area of the second storage device.

6. The information processing apparatus according to claim 2, wherein
if the second storage device is a storage device of the first type, the controller
reads data stored in each area in an order from the area of the final portion to the area of the head portion within the storage area of the first storage device, and
writes the data read in order from the first storage device, in each area in an order from an area of the final portion to an area of the head portion within storage area of the second storage device.

7. The information processing apparatus according to claim 1, wherein
if the second storage device is a storage device of the first type, the controller, after copying all data stored in the first storage device to the second storage device, copies the all data stored in the first storage device to the second storage device again.

8. The information processing apparatus according to claim 1, wherein
if the second storage device is a storage device of the first type, the controller, after copying all data stored in the first storage device to the second storage device, copies the system data stored in the first storage device to the second storage device again.

9. The information processing apparatus according to claim 1, wherein
the controller obtains device information from the second storage device, and, based on the device information, determines whether the second storage device is a storage device of the first type or a storage device of a second type that is configured by a magnetic disk.

10. A method of controlling an information processing apparatus provided with a first storage device and a second storage device with which mirroring of data with the first storage device is performed, the method comprising:

performing rebuild processing of the second storage device by copying data stored in the first storage device to the second storage device, wherein, if the second storage device is a storage device of a first type that is configured by a semiconductor memory, in the rebuild processing, system data used for activation of the information processing apparatus is copied to the second storage device after copying data other than the system data out of data stored in the first storage device is copied to the second storage device.

11. A non-transitory computer-readable storage medium storing a computer program for causing a computer to execute a method of controlling an information processing apparatus provided with a first storage device and a second storage device with which mirroring of data with the first storage device is performed, the method comprising:

performing rebuild processing of the second storage device by copying data stored in the first storage device to the second storage device, wherein, if the second storage device is a storage device of a first type that is configured by a semiconductor memory, in the rebuild processing, system data used for activation of the information processing apparatus is copied to the second storage device after copying data other than the system data out of data stored in the first storage device is copied to the second storage device.

* * * * *